(12) United States Patent
De Block et al.

(10) Patent No.: US 8,327,500 B2
(45) Date of Patent: Dec. 11, 2012

(54) WIPER BLADE

(75) Inventors: Peter De Block, Halen (BE); Wim Verboven, Tessenderlo (BE); Eric Windmolders, Kermt (BE)

(73) Assignee: Robert Bosch GmbH, Stuttgart (DE)

(*) Notice: Subject to any disclaimer, the term of this patent is extended or adjusted under 35 U.S.C. 154(b) by 1004 days.

(21) Appl. No.: 12/296,351

(22) PCT Filed: Apr. 19, 2007

(86) PCT No.: PCT/EP2007/053826
§ 371 (c)(1),
(2), (4) Date: Oct. 7, 2008

(87) PCT Pub. No.: WO2007/144220
PCT Pub. Date: Dec. 21, 2007

(65) Prior Publication Data
US 2009/0172910 A1      Jul. 9, 2009

(30) Foreign Application Priority Data
Jun. 12, 2006   (DE) .................. 10 2006 027 439

(51) Int. Cl.
*B60S 1/38* (2006.01)
(52) U.S. Cl. ............ 15/250.43; 15/250.201; 15/250.361
(58) Field of Classification Search ............... 15/250.43, 15/250.44, 250.451–250.454, 250.361, 250.31, 15/250.201
See application file for complete search history.

(56) References Cited

U.S. PATENT DOCUMENTS

| | | | | |
|---|---|---|---|---|
| 2,750,617 A * | 6/1956 | Oishei | ...... | 15/250.452 |
| 3,116,507 A * | 1/1964 | Scinta | ...... | 15/250.451 |
| 4,279,054 A * | 7/1981 | Hancou | ...... | 15/250.452 |
| 6,349,447 B1 | 2/2002 | Zimmer | | |
| 6,523,218 B1 | 2/2003 | Kotlarski | | |
| 6,668,419 B1 | 12/2003 | Kotlarski | | |
| 2004/0006840 A1* | 1/2004 | Zimmer | ...... | 15/250.351 |
| 2006/0156529 A1* | 7/2006 | Thomar et al. | ...... | 29/450 |
| 2008/0127442 A1 | 6/2008 | Jarasson et al. | | |

FOREIGN PATENT DOCUMENTS

| | | | |
|---|---|---|---|
| DE | 10333083 A1 | | 2/2005 |
| JP | 59045251 | | 3/1984 |
| JP | 3107550 | | 2/2005 |
| WO | WO2004/076252 | * | 9/2004 |
| WO | 2006/092356 A1 | | 9/2006 |

OTHER PUBLICATIONS

PCT/EP2007/053826 International Search Report.

* cited by examiner

*Primary Examiner* — Gary Graham
(74) *Attorney, Agent, or Firm* — Michael Best & Friedrich LLP

(57) ABSTRACT

A wiper blade (10) is proposed having a rubber elastic wiper strip (12). The wiper strip (12) is secured by means of at least one spring rail (14, 16) as supporting element. An end cap (20) is attached to at least one end of the longitudinal extension of the supporting element. According to the invention, the end cap (20) has at least one first, energy-absorbing region (22) and one second, in particular stabilizing region (24).

21 Claims, 3 Drawing Sheets

WIPER BLADE

BACKGROUND OF THE INVENTION

The invention relates to a wiper blade.

Numerous wiper blades are already known which comprise a rubber-elastic wiper strip which is mounted using at least one spring bar as supporting element. An end cap is attached to each end of the longitudinal extent of the spring bar or the wiper strip. This serves to close off the wiper blade and may for example also fix the wiper strip to the support element. The end caps are made from a solid, stable plastic in the form of an injection molding. When in operation, the wiper blade lies against a pane of glass, for example the windshield of a motor vehicle, and swings to and fro to remove precipitation situated thereon.

If the wiper blade is lifted away from the pane, it may strike against the pane when replaced thereon. Furthermore, in the event of heavy acceleration, such as may arise for example when traveling at high speeds and under a heavy wind load, the wiper blade is often pressed with its end caps against the windshield. The hard end caps may then break, so reducing the service life of the wiper blade.

SUMMARY OF THE INVENTION

The wiper blade according to the invention has the advantage that the end cap comprises a first, energy-absorbing area and a second, in particular stabilizing area. This gives rise to a longer service life for the wiper blade according to the invention and thus to greater operating safety and operating reliability.

It is particularly simple and cost-effective for the energy-absorbing area to be advantageously constructed from a more flexible material than the second area.

Ideally, the wiper strip comprises a wiper lip, which extends approximately parallel to the supporting element, the first area of the end cap being arranged on the same side of the supporting element as the wiper lip. In this way, the energy-absorbing first area is arranged in the area of the wiper lip and thus in the area of the windshield of the motor vehicle, such that the end cap is not destroyed if it strikes against the windshield.

It is particularly simple and cost-effective for the end cap to be produced using a multicomponent, in particular two-component injection molding method.

It has advantageously proven particularly effective to use a thermoplastic elastomer to produce the first area.

Advantageously, the second area comprises a connecting means for connecting the end cap to the supporting element and/or the wiper strip, such that the end cap is connected safely and reliably to the supporting element or the wiper strip.

BRIEF DESCRIPTION OF THE DRAWINGS

One exemplary embodiment of the invention is illustrated in the drawings and explained in greater detail in the following description. In the Figures.

DETAILED DESCRIPTION

Figure 1:
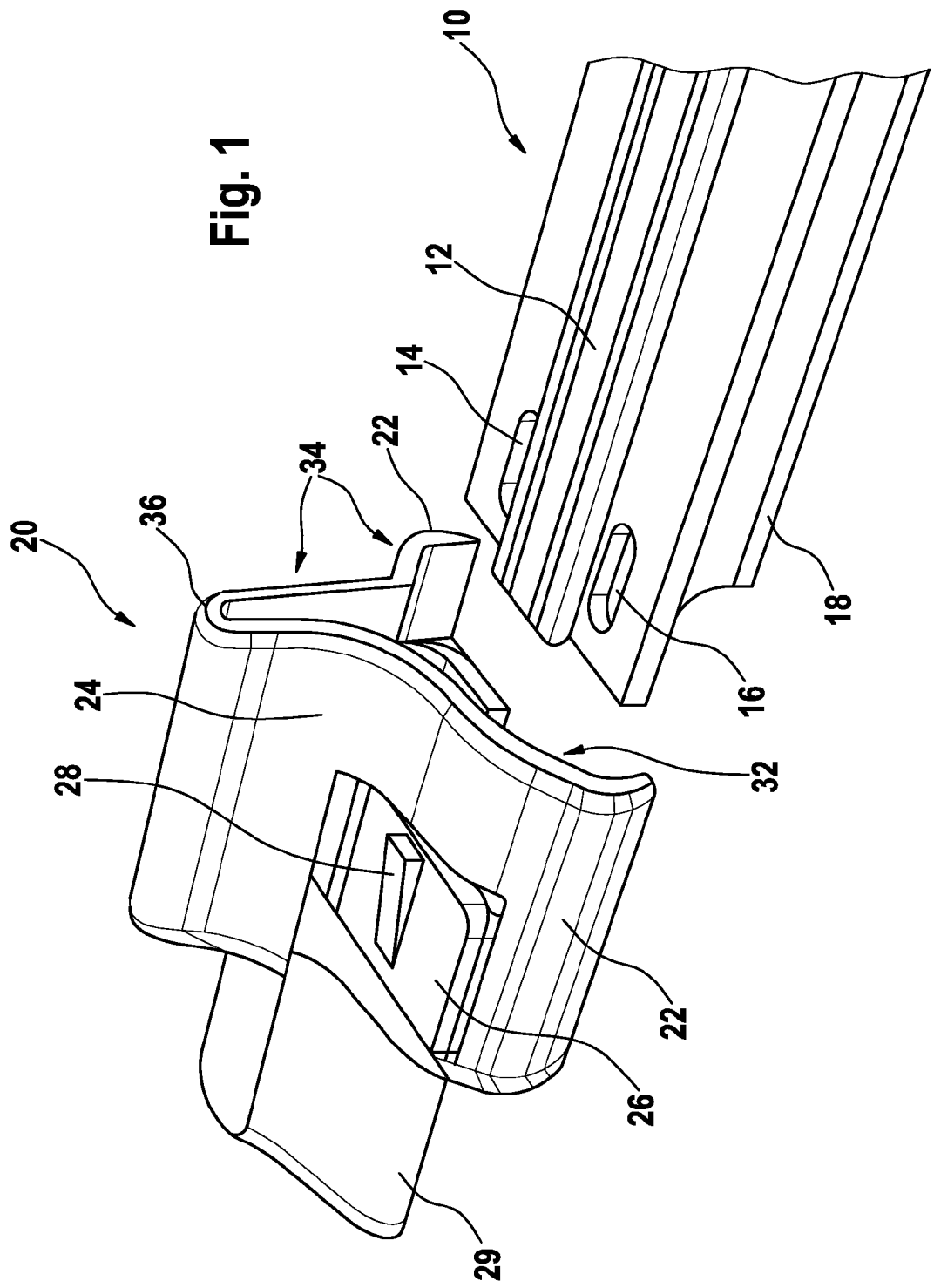
FIG. 1 is a perspective partial view of a wiper blade end with an end cap, in an exploded representation.

FIG. 1 shows one end of a jointless wiper blade 10. The other end is of substantially identical construction and omitted for reasons of clarity. The wiper blade 10 comprises a wiper strip 12, which is made of an elastomeric material and thus has rubber-elastic properties. The wiper strip 12 is mounted between two spring bars 14, 16, which are in each case made of a flat steel strip. On the side which faces the pane of glass, for example the windshield, of the motor vehicle when in operation and which is hereinafter designated the underside, the wiper strip 12 comprises a wiper lip 18, which is capable of wiping moisture from the pane as a result of the to-and-fro movement of the wiper blade. The longitudinal end of the wiper blade 10 is formed in each case by an end cap 20, which is pushed onto the spring bars 14, 16 at the end of their longitudinal extent. The spring bars 14, 16 thus form a supporting element, which supports the wiper strip 12. On the upper side of the spring bars 14, 16 remote from the underside, a wind deflector strip may additionally be attached to the spring bars 14, 16 or the wiper strip 12. The spring bars 14, 16 are inserted into a longitudinal groove in the wiper strip 12, such that the wiper strip 12 is supported by the spring bars 14, 16 along its entire longitudinal extent.

The end cap 20 comprises a first, energy-absorbing area 22, which consists of a flexible thermoplastic elastomer. This first area 22 closes off the end cap 20 in the direction of the wiper lip 18 and thus in the direction of the pane of glass of the motor vehicle in the manner of a collar. The other, second area 24 stabilizes the end cap 20 and is made from a harder and thus more brittle plastic than that of the first area 22. In the second area 24, a clip lug 26 with a snap-in nose 28 is also arranged as connecting means for mounting the end cap, this serving to attach and fix the end cap 20 to the wiper strip 12. As a variation, the end cap 20 may of course also be attached to the supporting element, i.e. to the spring bars 14, 16.

For fixing of the clip lug 26 a slider 29 is additionally provided, which prevents unintentional detachment of the end cap 20 from the wiper strip 12 or from the supporting element.

Figure 2:
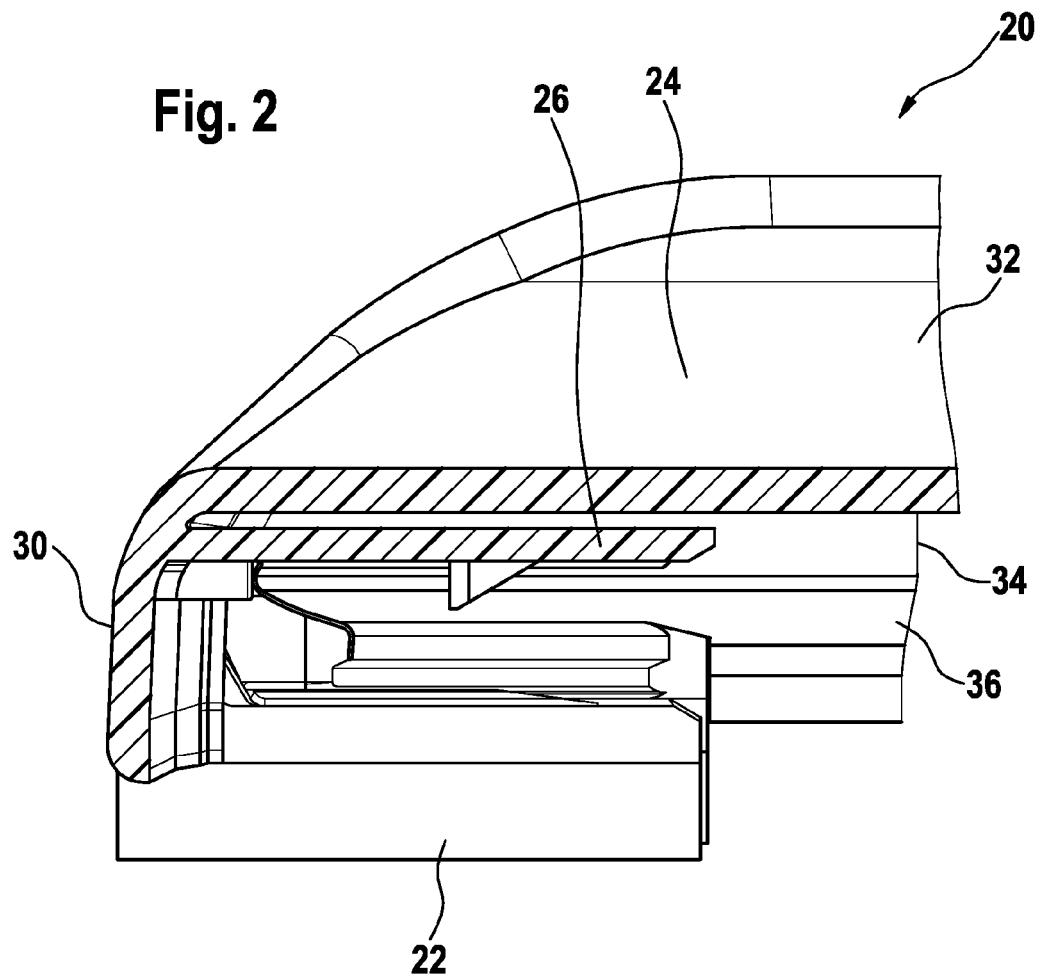
FIG. 2 shows a longitudinal section through an end cap of a wiper blade according to the invention and FIG. 3 shows a cross-section through an end cap of a wiper blade according to the invention.

FIG. 2 shows an end cap 20 in detail in longitudinal section. The end cap 20 substantially comprises the first area 22, which consists of a flexible, energy-absorbing material, and the second, stabilizing area 24, which consists of a somewhat harder and therefore more brittle material. The end cap 20 is substantially trough-shaped and at the same time open in the longitudinal direction towards the middle of the wiper blade 10, such that the longitudinal end of the wiper strip 12 with the spring bars 14, 16 may be partially accommodated by the end cap 20. The closed end of the end cap 20, which in the longitudinal direction of the wiper blade 10 closes off the latter towards the outside, is closed off by an end wall 30. The cross-section of the end cap 20 therefore substantially takes the form of an inverted V with two side walls 32, 34, which are connected together at a base 36 and between which the wind deflector strip may be accommodated. In the area of the two ends of the side walls 32, 34 remote from the base 36 there is in each case arranged a longitudinal groove 36, these accommodating the spring bars 14, 16 on sides remote from the wiper strip 12. The clip lug 26 with the ramp-shaped snap-in nose 28 extends, starting from the outer end of the end cap 20, parallel to the longitudinal extent of the wiper strip 12 inside the end cap 20 and only a little above the longitudinal groove 36, such that the clip lug 26 is forced upwards somewhat when pushed onto the wiper strip 12. In this way, the snap-in nose 28 may hook to the top of the wiper strip 12.

Below the longitudinal groove 36, and thus directed in the direction of the wiper lip 18 or in the direction of the pane of glass, the resilient first area 22 is arranged, which forms a collar-like extension of the end cap 20. The collar-like extension does not of course have to be provided all the way round.

As is visible in FIG. 2, it may extend over only a part of the side walls 32, 24 or the end wall 30. In one variation of the invention, starting from the end wall 30 the resilient first area 22 may also extend only downwards, thus in the direction of the wiper lip 18.

Likewise, the resilient first area 22 may also only extend from one or both of the side walls 32, 34.

Figure 3:
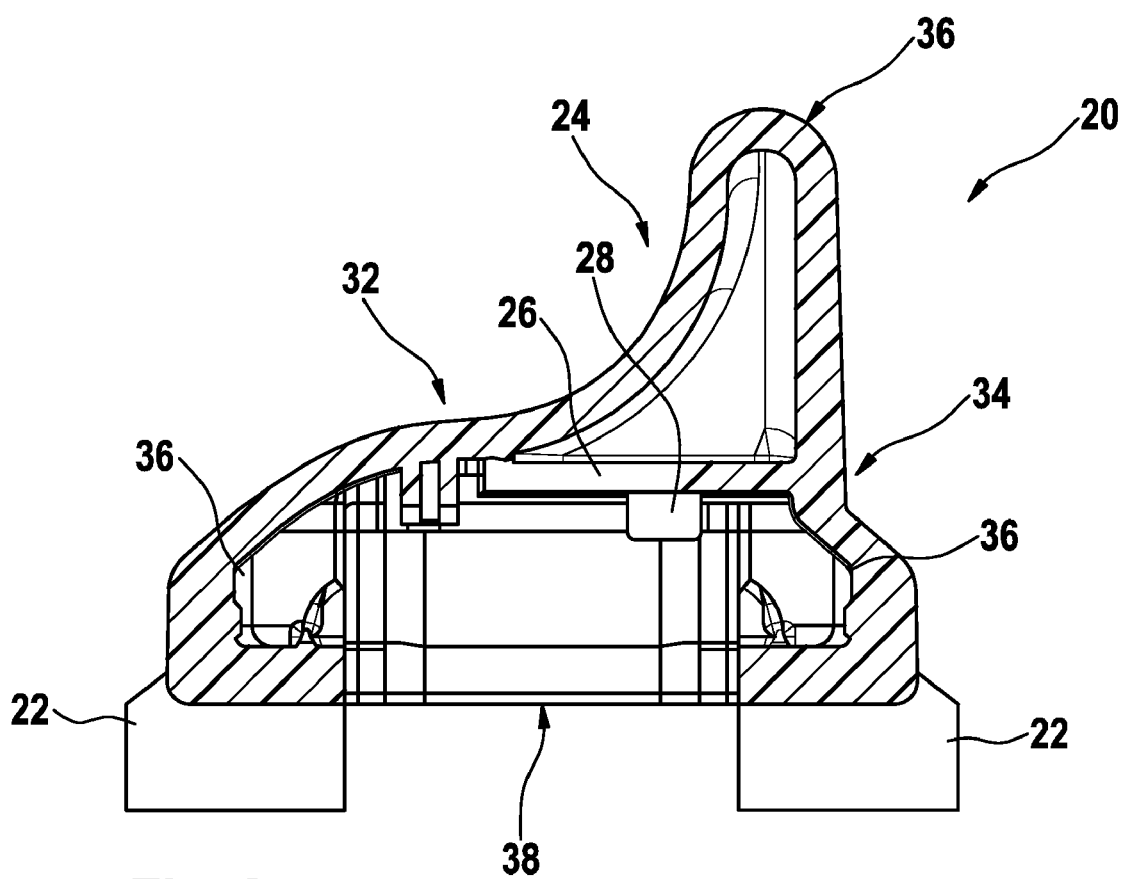

FIG. 3 shows an end-on view of the end cap 20 of a wiper blade 10 according to the invention. The end-on view is here shown from the middle, when viewed in the longitudinal direction, of the wiper blade 10 towards the end cap 20. The end cap 20 takes the form substantially of an inverted V with the base 36, at which the two side walls 32, 34 come together. These form the second, stabilizing area 24. The first side wall 32 here takes the form of a wind deflector strip and therefore has a substantially reverse S-shaped contour. The side walls 32, 34 are adjoined, on the side remote from the base 36, by the first, resilient areas 22. For stabilization, the ends of the side walls 32, 34 are joined together in the area of the first areas 22 by a bridge 38. The thus hollow inside is thereby capable of accommodating a body with a wind deflector strip, which is attached to the spring bars 14, 16 or to the wiper strip 12 and extends at least partially over the length of the wiper strip 12. The side walls 32, 34 additionally comprise, somewhat above the bridge 38, the longitudinal groove 36, which serves to accommodate the spring bars 14, 16. Above the longitudinal grooves 36 there is arranged the clip lug 26 with the snap-in nose 28.

The end cap 20 is made in one piece from plastic using the injection molding method. To prepare the first, resilient areas 22 a two-component injection molding method was used here. It goes without saying that the resilient areas 22 may also be attached by adhesive bonding or pushed on or attached interlockingly and/or non-interlockingly in some other way.

If, when in operation, the end caps 20 strike against the pane to be wiped, this impact is damped by the resilient first areas 22 and the energy from the impact is absorbed in such a way that the second, stabilizing area 24 of the end cap is protected and breakage of the end cap is avoided. To this end, in one variation of the invention the end cap 20 is also sheathed with an energy-absorbing layer, as the resilient area 22. In a further variation, a metal clip, of the type of a skeleton serving to attach the end cap, may for example have resilient plastic injection molded around it, such that the shape of the end cap 20 is formed by resilient material and the second, stabilizing area consists merely of a metal clasp. In a further variation the metal clasp may also be made from a suitable plastic.

The invention claimed is:

1. Wiper blade (10) having a rubber-elastic wiper strip (12), which is supported by at least one spring bar (14, 16) as supporting element, and having at least one end cap (20), which is attached to at least one end of a longitudinal extent of the supporting element, characterized in that the end cap (20) comprises at least one first, energy-absorbing area (22) formed of a first material and one second, stabilizing area (24) formed of a second material harder than the first material, the second, stabilizing area including side walls (32, 34) connected at a base (36) and each defining a groove (37) accommodating a spring bar (14, 16), the first, energy-absorbing area (22) being outside a periphery of the second, stabilizing area (24).

2. Wiper blade (10) as claimed in claim 1, characterized in that the first, energy-absorbing area (22) consists of a more flexible material than the second area (24).

3. Wiper blade (10) as claimed in claim 2, characterized in that the wiper strip (12) comprises a wiper lip (18), which extends approximately parallel to the supporting element, and the first area (22) of the end cap (20) is arranged on the same side of the supporting element as the wiper lip (18).

4. Wiper blade (10) as claimed in claim 3, characterized in that the end cap (20) is produced using a multicomponent injection molding method.

5. Wiper blade (10) as claimed in claim 4, characterized in that the first area (22) comprises a thermoplastic elastomer.

6. Wiper blade (10) as claimed in claim 5, characterized in that the second area (24) comprises a connecting means (26, 28) for connecting the end cap (20) to the supporting element and/or the wiper strip (12).

7. Wiper blade (10) as claimed in claim 1, characterized in that the wiper strip (12) comprises a wiper lip (18), which extends approximately parallel to the supporting element, and the first area (22) of the end cap (20) is arranged on the same side of the supporting element as the wiper lip (18).

8. Wiper blade (10) as claimed in claim 1, characterized in that the end cap (20) is produced using a multicomponent injection molding method.

9. Wiper blade (10) as claimed in claim 1, characterized in that the first area (22) comprises a thermoplastic elastomer.

10. Wiper blade (10) as claimed in claim 1, characterized in that the second area (24) comprises a connecting means (26, 28) for connecting the end cap (20) to the supporting element and/or the wiper strip (12).

11. Wiper blade (10) having a rubber-elastic wiper strip (12), which is supported by at least one spring bar (14, 16) as supporting element, and having at least one end cap (20), which is attached to at least one end of a longitudinal extent of the supporting element, characterized in that the end cap (20) comprises at least one first, energy-absorbing area (22) formed of a first material and one second, stabilizing area (24) formed of a second material different than the first material, the second stabilizing area (24) including side walls (32, 34) connected at a base (36) and each defining a groove (37) accommodating a spring bar (14, 16), the first, energy-absorbing area (22) extending downwardly from at least one side wall (32, 34) toward a windshield to be wiped.

12. Wiper blade (10) as claimed in claim 11, characterized in that the first, energy-absorbing area (22) consists of a more flexible material than the second area (24).

13. Wiper blade (10) as claimed in claim 11, characterized in that the first, energy-absorbing area (22) comprises a thermoplastic elastomer.

14. Wiper blade (10) as claimed in claim 11, characterized in that the second, stabilizing area (22) consists of a harder material than the first, energy-absorbing area (24).

15. Wiper blade (10) as claimed in claim 11, characterized in that the end cap (20) is produced using a multicomponent injection molding method.

16. Wiper blade (10) as claimed in claim 11, characterized in that the second, stabilizing area (24) further includes a connecting means (26, 28) for connecting the end cap (20) to at least one of the supporting element and the wiper strip (12).

17. Wiper blade (10) having a rubber-elastic wiper strip (12), which is supported by at least one spring bar (14, 16) as supporting element, and having at least one end cap (20), which is attached to at least one end of a longitudinal extent of the supporting element, characterized in that the end cap (20) comprises at least one first, energy-absorbing area (22) formed of a first material and one second, stabilizing area (24) formed of a second material different than the first material, the first material being more flexible than the second material, the second, stabilizing area (24) including side walls (32, 34) connected at a base (36) and a connecting means (26, 28) for connecting the end cap (20) to at least one of the supporting element and the wiper strip (12).

18. Wiper blade (10) as claimed in claim 17, characterized in that each side wall (32, 34) defines a groove (37) accommodating a spring bar (14, 16).

19. Wiper blade (10) as claimed in claim 17, characterized in that the first, energy-absorbing area (22) is outside a periphery of the second, stabilizing area (24).

20. Wiper blade (10) as claimed in claim 17, characterized in that the first, energy-absorbing area (22) extends downwardly from the second, stabilizing area (24) toward a windshield to be wiped.

21. Wiper blade (10) as claimed in claim 17, characterized in that the second material is harder than the first material.

* * * * *